Figure 1:
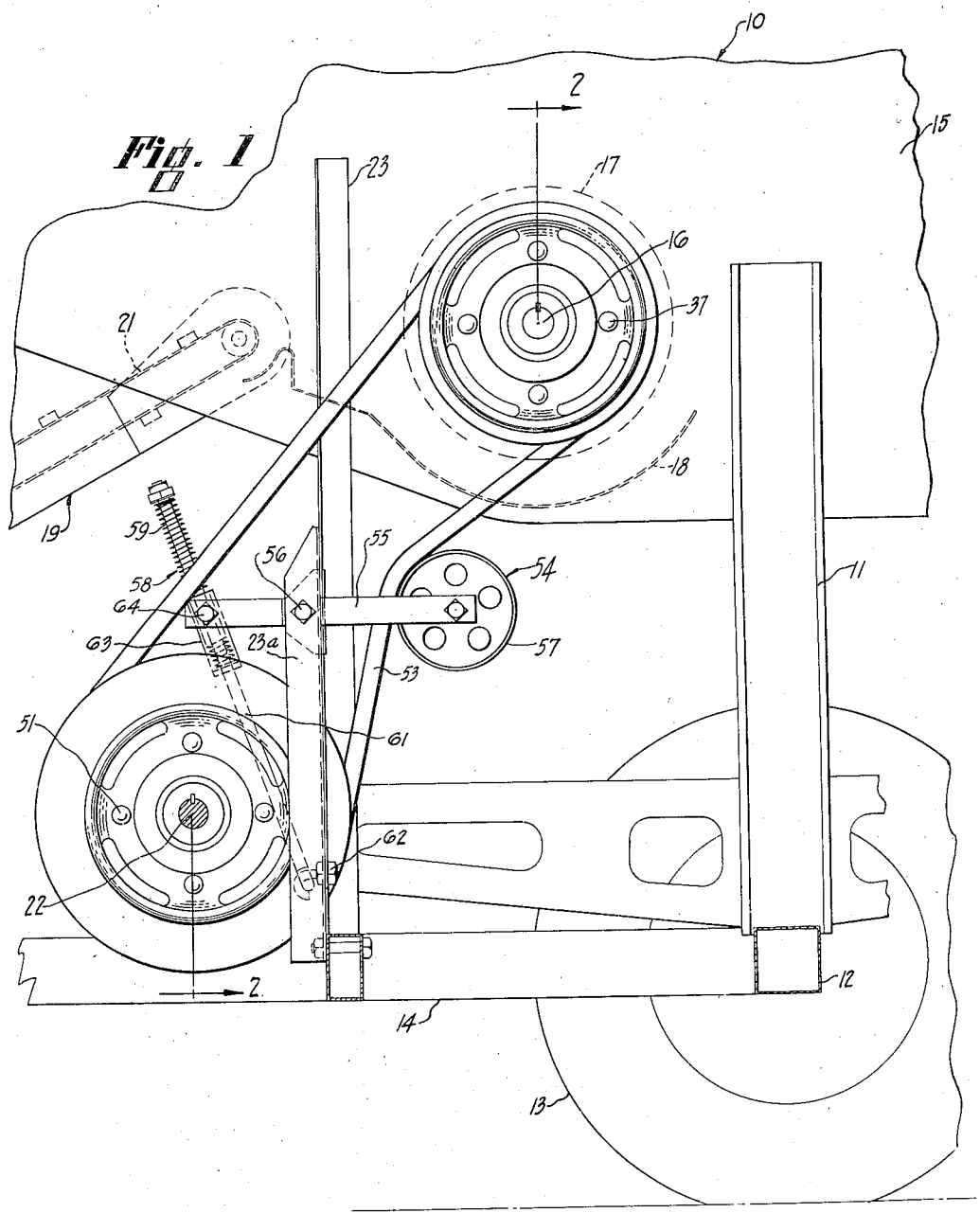

Nov. 17, 1942.  A. B. WELTY  2,302,483
THRESHER
Filed April 25, 1941  2 Sheets—Sheet 2

Inventor
Albert B. Welty
By Paul O. Pippel
Atty.

Patented Nov. 17, 1942

2,302,483

UNITED STATES PATENT OFFICE 2,302,483

THRESHER

Albert B. Welty, Moline, Ill., assignor to International Harvester Company, a corporation of New Jersey Application April 25, 1941, Serial No. 390,217

4 Claims. (Cl. 74—230.17)

This invention relates to a variable speed drive device, and more particularly it relates to a variable speed device adapted for use on harvester threshers.

It is desirable on modern harvester threshers to have a variable speed device mounted on the driver jackshaft and the cylinder shaft of the harvester thresher, whereby the cylinder speeds may be easily and quickly changed. It is essential that the speeds of the cylinder be changed when different crops are harvested. It is also desirable that the variable speed device be so constructed and arranged that the driver and driven pulleys may be adjusted by a manually adjustable means, which, after the adjustment has been made, may be locked in its adjusted position so as to insure the proper speed of the thresher cylinder.

It is also desirable that means be provided and associated with the belt that is trained around the driver and driven pulleys for compensating for the slack in the belt when the pulleys are adjusted.

According to the present invention mating pulley sections are mounted on a jack-shaft which may be driven from any suitable source of power for the thresher; mating pulley sections are also mounted on the shaft of the thresher cylinder. The alternate sections of the mating pulley sections are fixed to their respective shafts, and one pulley of each mating pulley is slidably mounted with respect to the fixed pulley. A manual adjusting means in the form of a hand wheel in threaded engagement with the fixed pulley is operatively connected with the movable pulley section for adjusting said movable section axially of the shaft on which it is mounted. Clamping means are provided between the hand wheel and the movable pulley section, whereby the movable pulley section may be locked in its adjusted position. A spring mounted belt tightener cooperates with a belt that is trained around the mating pulley sections.

By virtue of this particular construction and arrangement of parts, a compact and quickly adjustable variable speed device is provided.

These and other objects and advantages of the present invention will be apparent to those skilled in the art after a consideration of the following detailed description of the preferred structural embodiment, taken in conjunction with the accompanying drawings.

Figure 2:
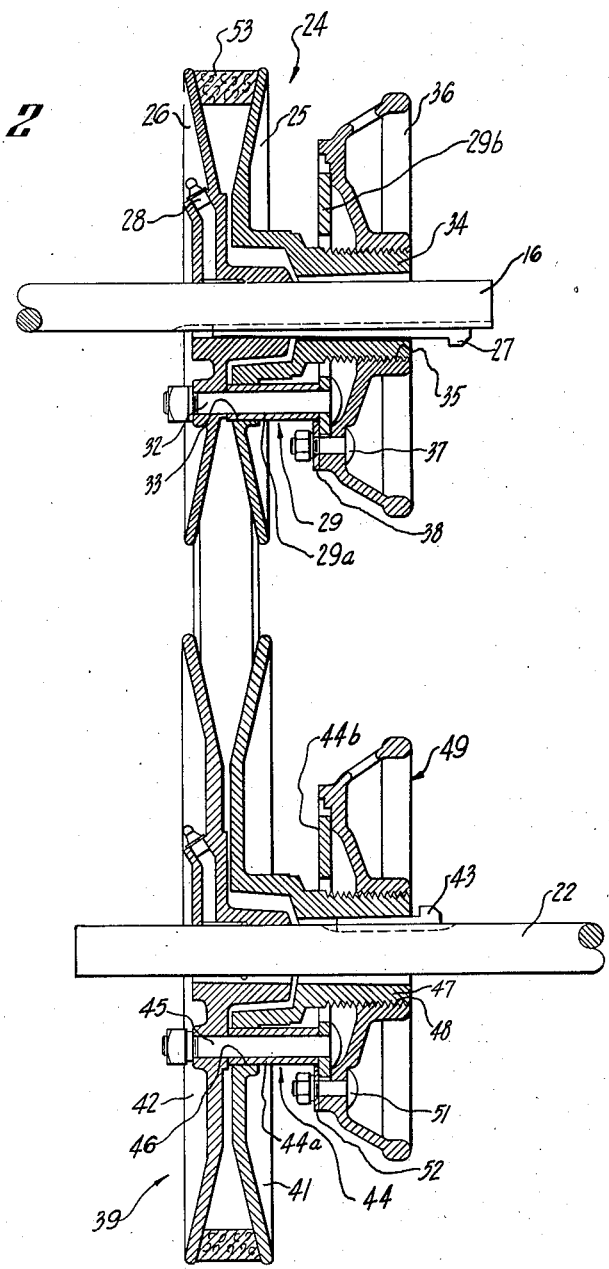

In the drawings:

Figure 1 is a side view, partly in section, and shows the variable speed device mounted on the jack-shaft and cylinder-shaft of a harvester thresher; and, Figure 2 is a sectional view taken along the line 2—2 of Figure 1.

Referring now to the drawings, more particularly to Figure 1, it will be seen that the harvester thresher chosen to illustrate the principles of the present invention comprises a separator 10, which is mounted on a frame structure 11 that is adapted to rest on a transverse axle 12, at the ends of which are mounted the usual wheels 13, only one of which is shown. A draft or A-frame 14 extends forwardly from the axle 12. The separator 10 comprises the usual spaced vertical side sheets 15, in which is journaled a cylinder shaft 16. On the shaft 16 is provided a conventional threshing cylinder 17 that is adapted to cooperate with a concave 18 which is also secured between the side sheets 15. At the forward portion of the separator 10 is pivotally mounted a feeder 19 in which is provided a conveyer 21 that conveys the cut grain into the threshing cylinder 17 and the concave 18. On the A-frame 14 is journaled, in suitable bearings, a jack-shaft 22 which is adapted to be driven from any suitable source of power for the machine. The mid-portion of the A-frame 14 is connected to the separator 10 by a vertical brace member 23. On the cylinder shaft 16 and the jack-shaft 22 are mounted mating pulley sections.

Referring now to Figure 2 and to the cylinder shaft 16, it will be seen that on this shaft is mounted a mating pulley unit 24 which comprises pulley sections 25 and 26. The pulley section 26 is secured to the shaft 16 by a key 27. The shaft 16 is in effect the driven shaft. A suitable lubrication means 28 is provided in the pulley section 26. The pulley section 25 encircles the shaft 16 and is axially movably mounted on a suitable supporting means 29 which extends from the pulley section 26. The supporting means 29 comprises a plurality of spaced sleeves 29a which are secured to the pulley section 26 by means of bolts 32. The sleeves 29a are arranged parallel to the shaft 16, and the projecting ends of the sleeves are secured by the bolts 32 to a circular ring member 29b that encircles the shaft 16. On the sleeves 29a the pulley section 25 is axially slidably mounted. The pulley section 25 is provided with openings 33 which are adapted to be inserted over the sleeve portions 29a. By this construction the pulley section 25 may move axially with respect to the fixed pulley 26 on the sleeve portions 29a. A hub portion 34 extends from the pulley section 25.

The hub portion 34 is provided with threads 35 on which is turnable a manual adjusting means in the form of a hand wheel 36 which is provided with a plurality of spaced bolts 37, having washers 38 provided thereon that cooperate with the outer periphery of ring member 29b. When it is desired to adjust the pulley section 25, the bolts 37 are loosened and the hand wheel 36 rotated either to the right or to the left, so to move the pulley section 25 toward or away from the fixed pulley section 26. After the pulley sections have been adjusted the bolts 37 are then tightened so as to secure the pulley sections 25 and 26 in a fixed position with respect to each other.

On the jack-shaft 22 is mounted a mating pulley 39. The jack-shaft 22 is in effect the driver shaft. The mating pulley 39 comprises pulley sections 41 and 42. In this case, the pulley section 41 is secured to the jack-shaft 22 by a key 43. In this particular constuction alternate sides of the mating pulley sections 24 and 39 are secured to their respective shafts. The pulley section 41 is axially movably mounted on a suitable supporting means 44 which extends from the pulley section 42. The supporting means 44 comprises a plurality of spaced sleeves 44a which are secured to the pulley 42 by means of bolts 45. The sleeves 44a are arranged parallel to the shaft 22 and their projecting ends are clamped to a ring member 44b which encircles the shaft 22. The pulley section 41 is axially slidably mounted on the sleeves 44a. A plurality of spaced openings 46 provided in the pulley section 41 are adapted to be inserted over the sleeves 44a. From the pulley section 41 extends a hub portion 47 which is provided with threads 48. On the threads of the hub portion 47 is turnably carried a manually adjustable means in the form of a hand wheel 49 which is provided with a plurality of spaced bolts 51 on which are provided washers 52 that cooperate with the outer periphery of a ring member 44b. In the event that it is desired to adjust the sections of the mating pulley 39, the bolts 51 are loosened and the hand wheel 49 rotated either to the right or to the left so as to move the pulley section 41 axially toward or away from the fixed pulley section 42. After the pulley sections are in their desired adjusted positions, the bolt means 51 are again tightened. The bolt means tend to securely lock the hand wheel to the fixed pulley so that, as the machine travels over the unevenness of the terrain, the pulley sections 25 and 26, and 41 and 42 will not vibrate so as to change their relation to one another. A V-belt 53 is trained around the mating pulleys 24 and 39 as shown in Figures 1 and 2. However, it has been found that adjustment and the climatic conditions will soon cause the belt to stretch. Since it is impossible and impractical to shorten the belt, it is desirable that a suitable belt tightener means be associated therewith.

The novel belt tightener means 54 is shown in Figure 1 and comprises a member or arm 55 which is pivotally mounted on the vertical support 23 and a vertical member 23a by means of a bolt 56. The arm 55 extends to either side of the bolt 56 and has a pulley 57 rotatably mounted at one end thereof, which is adapted to engage the belt 53 and a yieldable holding means 58 associated with the other end of the arm 55. The yieldable means 58 comprises a spring 59 which encircles a rod 61 that is connected at its lower end to a suitable bolt 62 provided on the vertical members 23 and 23a. The rod 61 extends upwardly and is inserted in a suitable opening provided in an L-shaped member 63 which is secured to the arm 55 by a bolt 64. A suitable nut is provided on the end of the rod 61 so as to hold the spring 59 against the spaced portion of the L-shaped member 63. By this particular construction the springs 59 rotate the arm 55 counter-clockwise about the pivot bolt 56 and compensate for the slack in the belt 53. The belt tightener means 54 also insures the proper position of the belt 53 on the respective pulleys 24 and 39 so that the exact speed desired is always obtained.

In view of the preceding description, it should be apparent that a novel and quickly adjustable variable speed device has been provided for a harvester thresher. The variable speed device is economical to manufacture, is positive in operation, and will always drive the driven shaft from the driver shaft at the speed required by the adjustment of the mating pulleys 24 and 39 with respect to each other. If an additional range of speeds is desired, the mating pulley 24 may be mounted on the jack-shaft 22, and the mating pulley 39 may be mounted on the cylinder shaft 16.

While only the preferred construction in which the principles of the present invention have been embodied has been described, it is to be noted that the invention is not to be limited to the specific details shown and described, but that, in effect, widely different means may be employed in the practice of the broader aspects of this invention.

What is claimed is:

1. In a variable speed device, a driver shaft, a driven shaft, mating pulley sections on the respective shafts, means for securing one pulley section of said mating pulley sections to one shaft, means for securing the opposite pulley section of said other mating pulleys to the other shaft whereby the opposed sections of the pulley will be in a fixed position with respect to each other, a plurality of sleeve means extending from said fixed pulleys, said other mating section of said pulley movably mounted on said sleeve means, a hub portion extending from said movable pulley, a hand wheel in threaded engagement with each of said hub portions, means carried by said hand wheels for supporting said sleeves, and means associated with said hand wheels and said sleeves for securing said wheels and sleeves together.

2. In a variable speed device, a driver shaft, a driven shaft, mating pulley sections on the respective shafts, means for securing one pulley section of said mating pulley sections to one shaft, means for securing the opposite pulley section of said other mating pulleys to the other shaft whereby the opposed sections of the pulley will be in a fixed position with respect to each other, a plurality of sleeve means extending from said fixed pulleys, said other mating section of said pulley movably mounted on said sleeve means, a hub portion extending from said movable pulley, a ring member secured to the sleeves, a hand wheel in threaded engagement with each of said hub portions and associated with said ring member, and adjustable means for securing said ring member to said hand wheel.

3. In a harvester, a driver counter-shaft, a driven cylinder shaft spaced from said counter-shaft, mating pulley sections on said shafts, means for securing one pulley of each of said mating pulley sections to said shafts, a plurality of sleeves extending from the fixed pulleys and arranged parallel to said shafts, a ring encircling said shafts and secured to said sleeves, the mating pulley of said pulley sections slidably mounted on said sleeves, a hub extending from said slidably mounted pulleys and encircling said shafts, a hand wheel encircling each of said hubs and having a portion in threaded engagement with said hubs for moving said slidably mounted pulley sections with respect to said fixed pulley sections, and means carried by said hand wheels and associated with said rings for locking said rings to said hand wheels.

4. In a harvester, a driver counter-shaft, a driven cylinder shaft spaced from said counter-shaft, mating pulley sections on said shafts, means for securing one pulley of each of said mating pulley sections to said shafts, supporting means extending from the fixed pulleys, a ring encircling said shaft and secured to the supporting means, the mating pulley of said pulley sections slidably mounted on said supporting means, a hub extending from said slidably mounted pulleys and encircling said shafts, a manually adjustable means encircling each of said hubs and having a portion in threaded engagement with said hubs for moving said slidably mounted pulley sections with respect to said fixed pulley sections, and clamping means associated with the manually adjustable means and the ring for securing said manually adjustable means to said ring.

ALBERT B. WELTY.